US000001426H

United States Statutory Invention Registration [19]

[11] Reg. Number: H1426

Toeppen

[43] Published: Apr. 4, 1995

[54] APPARATUS AND METHOD FOR DETERMINING THE OPTICAL POWER PASSING THROUGH AN OPTICAL FIBER

[75] Inventor: John S. Toeppen, Livermore, Calif.

[73] Assignee: The United States of America as represented by the United States Department of Energy, Washington, D.C.

[21] Appl. No.: 967,493

[22] Filed: Oct. 28, 1992

[51] Int. Cl.[6] ..... G01K 17/20

[52] U.S. Cl. ..... 374/32; 250/214 R; 385/12

[58] Field of Search ..... 385/12, 14, 15, 31, 385/32, 48, 49; 250/227.11, 227.14, 227.28, 227.29, 458.1, 459.1, 483.1, 484.1, 485.1, 487.1; 372/6; 356/44

[56] References Cited

U.S. PATENT DOCUMENTS

| | | | |
|---|---|---|---|
| 4,081,672 | 3/1978 | Caspers et al. | 385/48 X |
| 4,473,848 | 9/1984 | Juergensen | 250/227.28 |
| 4,542,987 | 9/1985 | Hirschfeld | 356/44 |
| 4,673,299 | 6/1987 | Dakin | 356/44 X |
| 4,768,886 | 9/1988 | Hirschfeld et al. | 374/161 |
| 5,000,540 | 3/1991 | Nakamura | 385/12 X |
| 5,146,521 | 9/1992 | Hartog | 385/12 X |

OTHER PUBLICATIONS

V. Stojanac, "Selection Criteria for Optical Power Meters," *Fiber Optic Product News*, vol. 7, No. 6, Jun. 1992, one page in length.

Advertisement page entitled, "Hand Held Precision That's Affordable!," *Fiber Optic Product News*, vol. 7, No. 6, Jun. 1992, one page in length.

Advertisement page entitled "'OTDRize' Your PC!," *Fiber Optic Product News*, vol. 7, No. 6, Jun. 1992, one page in length.

Advertisement page entitled, "Fotec (Products are designed for fiberoptic network testing)," *Fiber Optic Product News*, vol. 7, No. 6, Jun. 1992, p. 64.

Advertisement page entitled, "Laser Precision Corporation (Provides solutions to customers' testing needs)," *Fiber Optic Product News*, vol. 7, No. 6, Jun. 1992, p. 42.

Advertisement page entitled, "Anritsu Wiltron Sales Company (Manufacturer of test equipment)," *Fiber Optic Product News*, vol. 7, No. 6, Jun. 1992, p. 82.

*Primary Examiner*—Bernarr E. Gregory

*Attorney, Agent, or Firm*—Alan D. Minsk; Miguel A. Valdes; Roger S. Gaither

[57] ABSTRACT

An apparatus and method for determining the optical power transmitted through an optical fiber. The invention is based on measuring the intensity of the fluorescence produced by a doped segment of an optical fiber. The dopant is selected so that it emits light at a different wavelength than that responsible for producing the fluorescence. The doped segment is of sufficient length and dopant concentration to provide a detectable signal, but short enough to prevent the doped segment from serving as a gain medium, resulting in amplified spontaneous emission and excess fluorescence traveling along the optical fiber. The dopant material is excited by the optical signal carried by the fiber, causing a fluorescence. In the preferred embodiment the intensity of the fluorescence is proportional to the intensity of the propagating light. The signal power is then determined from the intensity of the fluorescence. The intensity of the fluorescent signal is measured by a photodetector placed so as to detect the light emitted through the side of the doped segment. The detector may wrap around the circumference of the fiber, or be placed to one side and used in conjunction with a reflector placed on the opposing side of the fiber. Filters may be used to shield the detector from other light sources and assist with accurately determining the optical power of the signal propagating within the fiber.

22 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR DETERMINING THE OPTICAL POWER PASSING THROUGH AN OPTICAL FIBER

The U.S. Government has rights to this invention pursuant to Contract No. W-7405-ENG-48 between the U.S. Department of Energy and the University of California, for the operation of the Lawrence Livermore National Laboratory.

TECHNICAL FIELD

The present invention is generally directed to optical fibers, and more specifically, to an apparatus and method for determining the power carried by an optical signal passing through an optical fiber, by measuring the fluorescence produced by the excitation of a dopant material inserted into a segment of the fiber.

BACKGROUND OF THE INVENTION

Optical fibers are flexible, transparent devices which can be used to transmit information or images by means of optical signals. An optical fiber generally consists of a glass or plastic core surrounded by a cladding, where the refractive index of the core is higher than that of the cladding. The cladding protects the core-cladding interface from contaminants and contact with adjacent fibers, any of which could cause losses due to leakage of the signal propagating in the fiber. Light propagates through the fiber by means of multiple total internal reflections induced by the cladding which occur at the core-cladding interface.

Optical fibers are used in a variety of applications as a means of delivering power or transmitting images to a remote location. Optical fibers may be coupled to a laser to transmit information to a photodetector by modulating the intensity of the laser light. They may also be doped and used as an amplification medium, where an optical signal induces the stimulated emission of photons from the excited atoms of the dopant which has been energized by light of a different wavelength than that of the signal being amplified.

In situations where optical power is delivered by means of an optical fiber, it is often important to know how much power is being transmitted by the fiber, either at a point along its length, or at its end. This measurement is usually made by placing a photodetector and a device which indicates the intensity of the detected signal (which is calibrated so that it acts as a power meter) at the fiber end, or using optical elements (lenses, half-silvered mirrors) placed at the fiber end to enable the beam to be sampled from a position off of the fiber axis.

These methods of measuring the intensity of the optical signal traveling through a fiber (and from that determining the optical power) are based on directly measuring the total or fractional intensity at the output end. While useful, this approach has several drawbacks. It is intrusive and may unnecessarily complicate the optics at the output end. Also, it is often desirable to measure the injected power at the input end of the fiber to allow adjustment of the input end optics, and in some situations it is not feasible to introduce a detector at this position. Another drawback of such methods is that the sampling of the optical power may reduce it below the level at which it is intended to be used. In addition, depending upon the application for which the fiber is being used, there may be insufficient room at the fiber end for the placement of diagnostic equipment.

Diagnostic methods have also been applied to determine the optical power passing through an optical fiber at an intermediate position along the length of the fiber. One such method is based on measuring the intensity of the light leaked from the sides of the fiber. However, this method has been shown to be inaccurate because the intensity which is measured was found to depend upon the injection geometry, i.e., the light measured is that injected into the fiber at high angles, and not the throughput power corresponding to light propagating along the fiber axis.

Another approach which can be used is to modify the core and cladding so as to induce additional leakage. This is accomplished by scoring the core, bending the fiber, or using index matching. In these cases it is again found that the rays injected at extreme launch angles are more likely to escape the fiber and be detected. Thus, measurements made under these conditions do not provide an accurate estimate of the power carried by the fiber.

What is desired is a means of measuring the intensity of a signal transmitted by an optical fiber, and hence determining its power, in a manner which provides an accurate representation of the intensity of the light propagating along the fiber axis, and which does not interfere with optics or other equipment placed at the ends of the fiber.

SUMMARY OF THE INVENTION

The present invention is directed to an apparatus and method for determining the optical power transmitted through an optical fiber. The power is determined from a measurement of the intensity of the fluorescence induced in a doped segment of fiber which is spliced into the optical fiber. The dopant is selected so that it emits light at a different wavelength than that of the optical signal which induces the fluorescence. The splice is made in such a way as to minimize the losses through the spliced ends. The doped segment is of sufficient length and dopant concentration to provide a detectable signal, but short enough to prevent the doped segment from serving as a gain medium, resulting in amplified spontaneous emission and excess fluorescence traveling along the optical fiber.

The dopant material is excited by the optical signal carried by the fiber, inducing a fluorescence whose intensity, under appropriate conditions, is proportional to the intensity of the propagating light. The intensity of the fluorescent signal is measured by a photodetector placed so as to detect the light emitted through the side of the doped segment, i.e., adjacent to the cladding surrounding the doped core. The detector may wrap around the circumference of the doped segment, or be placed to one side and used in conjunction with a reflector placed on the opposite side of the fiber. Filters may be used to shield the detector from other light sources and assist with accurately determining the optical power carried by the signal propagating within the fiber.

Further objects and advantages of the present invention will become apparent from the following detailed description and accompanying drawings.

DESCRIPTION OF THE PREFERRED EMBODIMENT

Figure 1:
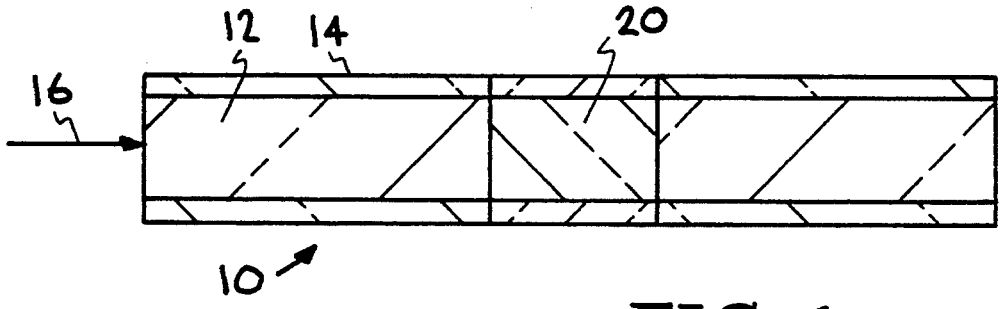
FIG. 1 is a cut-away side view of a portion of an optical fiber into which has been spliced a doped segment whose fluorescence will be detected as a means of determining the optical power transmitted through the fiber.

Referring to the figures, and in particular to FIG. 1, there is shown a cut-away side view of a portion of an optical fiber 10 into which has been spliced a doped segment 20 whose fluorescence will be measured as a means of determining the optical power transmitted through fiber 10. Fiber 10 is typically made of silica glass or plastic and is composed of an inner core 12 and a surrounding cladding 14.

An optical signal 16 transmitted by fiber 10 propagates inside core 12 by means of multiple total internal reflections induced by cladding 14. Doped segment 20 is composed of the same material as that of fiber 10, with the addition of a suitable dopant material in its core.

The dopant material should be selected so as to have a very small absorption coefficient at the predominant wavelength of light which is propagating through fiber 10. The absorption cross section of doped segment 20 should also be time-independent. It is important that the fluorescent material return to the ground state quickly enough that the ground state is not "bleached" into a transparent condition such that subsequent throughput light is not accurately measured. The dopant concentration in segment 20 should be uniform as measured over the cross sectional area of segment 20. This is necessary in order to obtain a geometrically representative indication of the power in fiber 10. If the distribution of dopant is not uniform across the cross sectional area of segment 20, non-axial propagation modes of optical signal 16 in fiber 10 will be disproportionately represented.

While penetrating dyes and ion exchange dopants can be used to provide some of the benefits of the present invention, it is preferable that the fluorescent material be uniformly distributed through the core of segment 20 at the time of its manufacture.

If an organic fluorescent dye is used as the dopant material, it is important to be aware of its potential for degradation as a result of long-term exposure to the injected signal. If such degradation does occur, it can become the source of a non-linear relationship between the intensity of the injected signal and that of the fluorescence. In the most general terms, the dopant may be any material which is capable of emitting fluorescence and which can be used to dope an optical fiber, provided the doping can be carried out in accord with the criteria discussed in this application.

The dopant material chosen and dopant dose used are dependent upon the specific application, i.e., the power levels being used and the predominant wavelength of light which constitutes signal 16. The dopant selected must be capable of absorbing photons of an energy corresponding to the predominant wavelength of light found in propagating signal 16, but at the same time not have too large an absorption cross section at the power levels being considered. It is also important that the dopant material emit photons at a wavelength which can be discriminated from that of optical signal 16. For visible wavelengths of light, examples of suitable dopant materials are the rare earth metals such as neodymium or erbium. For example, neodymium strongly absorbs light at wavelengths of 510 nanometers (nm) and 578 nm, while producing fluorescence between 850 nm and 1100 nm.

As indicated, it is important that the dopant material selected not have a strong absorption cross section at the wavelength and power level of the excitation signal. This is to insure that optical signal 16 propagating within core 12 of fiber 10 is only sampled, instead of being absorbed. It is also preferable that the dopant level be sufficiently high that only a small fraction of the fluorescent species is in the excited state (owing to the stimulation provided by the propagating signal) at the highest anticipated power levels. This is to reduce the possibility of producing a significant amount of radiation by the stimulated emission of photons.

If the above conditions relating to the dopant characteristics and distribution are met, the intensity of the fluorescence produced by the dopant species contained in doped segment 20 will be proportional to the intensity of optical signal propagating through fiber 10. In this case it is a simple matter to relate the intensity of the measured fluorescence to the power contained in signal 16.

While a linear relationship between the intensity of optical signal 16 and the intensity of the measured fluorescence is preferable, the present invention may still be used under conditions which produce a non-linear relationship between these quantities. In such a case a suitable calibration must be performed to relate the optical power to the measured data. A non-linear relationship may arise if the absorption coefficient of the dopant is high or if the optical power propagating through fiber 10 is at a sufficiently high level, causing significant population inversion of the energy levels of the dopant.

At low levels of illumination (non-inverted population levels) the fluorescent output is omnidirectional. At higher intensities fluorescent emissions (called spontaneous emissions) stimulate the emission of other excited fluorescent material creating a condition called Amplified Spontaneous Emissions (ASE). In this situation, the portion of the spontaneously emitted light which happens to proceed along the fiber axis encounters excited fluorescent material which it stimulates into emitting light of the same wavelength and direction. This creates a "superradiant" or "superfluorescent" condition which is similar to a lasing or prelasing condition.

When the excited gain medium is long and pumped to near inversion levels, the fluorescence becomes more directional and narrower in spectral bandwidth. When an optical signal is injected into this active gain medium, stimulated emission of photons occurs, i.e., lasing. This is an example of a situation in which the measured fluorescence and the intensity of the optical signal have a non-linear relationship, i.e., where each detected fluorescent photon does not always represent a fixed number of throughput photons (in this regard, it is noted that it is desirable that the power of the fluorescent signal be approximately in the range of one milliwatt).

Since some of the fluorescence produced by doped segment 20 will travel along the fiber and not be measured by an adjacent detector, it is important that doped segment 20 be constructed so that it will not provide a gain medium for on axis light and thereby produce amplified spontaneous emission, and hence a non-linear output. This is why it is important to properly select the parameters for doped segment 20, and to tailor them to the intended application.

Guidance in determining the appropriate parameters for the doped segment which is to be inserted into the optical fiber can be obtained by considering how the intensity of an injected signal is depleted as a portion of its photons are absorbed by the dopant. The intensity as a function of wavelength, $I(\lambda)$, of a signal $I_O$ propagating through an absorber of length L, containing absorbers of density N atoms/cm$^3$, each having an absorption cross section of $\sigma$cm$^2$, is given by:

$$I(\lambda) = I_o \exp(-N\sigma L).$$

The absorption cross section is a function of wavelength, so that this equation allows one to evaluate the tradeoffs between the length of the doped segment, the number density of the dopants it contains, the ability of a specified dopant type to absorb an injected signal, and the depletion of the injected signal intensity which results from the absorption. These factors can be used to assist in determining the desired parameters of a doped segment based on the operating conditions under which it will be used.

Once the doped segment 20 has been prepared, it must be spliced into fiber 10. The splicing should be carried out in a manner which minimizes the loss of power from the optical signal in fiber 10. The core and cladding of the spliced segment should have the same index of refraction as the core 12 and cladding 14 of fiber 10. The goal is to introduce a segment into fiber 10 which is optically identical to the adjacent fiber, except for the presence of the dopant material in its core.

There are a number of methods which can be used to splice segment 20 into fiber 10. In all of these methods, it is important to maintain a good alignment between the ends of segment 20 and the adjacent ends of fiber 10 as a means of reducing the loss of power from the optical signal propagating through fiber 10. Glass or metal tubes are sometimes used to align the ends with a high degree of precision. The gap between the ends of segment 20 and the adjacent ends of fiber 10 can be filled with fluids, gels, or solids which match the refractive index of the fiber material to reduce the reflection losses caused by light exiting and reentering the core of an optical fiber. As most index matching materials are organic compounds which are subject to breakdown at high power levels, their use may be limited to low power signals or short term situations.

Another standard splice method is a direct thermal fusion splice. This produces a permanent splice by fusing the ends of the affected fibers, and can be performed by commercially available equipment. One potential problem is that currently available equipment is intended to be used with fibers having a relatively small core diameter. In order to splice the larger diameter fibers used in some high power applications, specialized thermal splicing equipment may have to be developed. This splicing method is generally preferred because the splice is not susceptible to breakdown at high power levels.

Yet another method of splicing fibers is one based on the use of low melting point glasses, such as the Schott FK-3 glass (having an index of refraction equal to 1.46), manufactured by Schott Glass Technologies, Inc., of Duryea, Pa. In this method, a low melting temperature glass is used to solder the ends of high melting temperature fused silica fibers together. A variation of this method, and an alternative embodiment of the present invention, would be to construct the doped segment itself from a fiber material having a lower melting point than the fiber to which it is to be fused.

Figure 2:
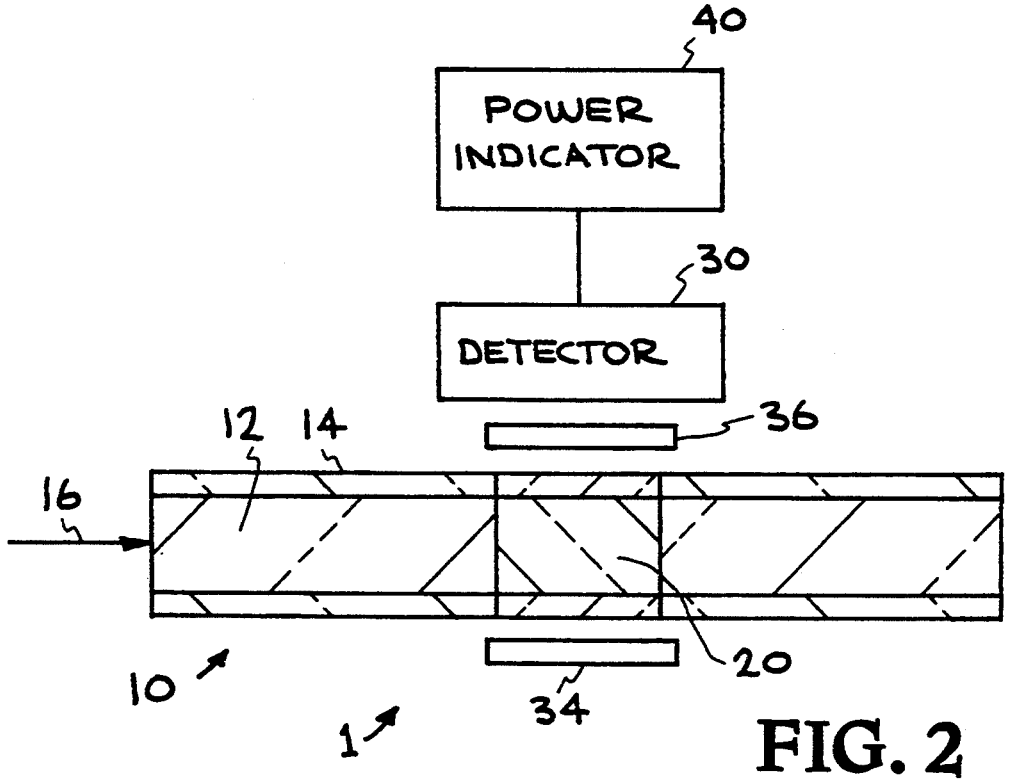
FIG. 2 shows the components of the optical power measuring apparatus of the present invention which are used to determine the optical power transmitted through an optical fiber.

FIG. 2 shows the components of the optical power measuring apparatus 1 of the present invention which is used to determine the optical power transmitted through optical fiber 10 by measuring the intensity of the fluorescence produced by doped segment 20. An optical signal 16 is transmitted through fiber 10, causing electrons in the dopant material to be excited to higher energy levels. As the electrons return to an unexcited state, photons are emitted by the dopant material, producing a fluorescence. This fluorescence is detected by detector 30, and the intensity of the detected fluorescent signal is then used as the basis for determining the power contained in the signal propagating through fiber 10 (based on the relationship between the intensity of the signal and the intensity of the fluorescence), where the power is indicated by power indicator 40.

In FIG. 2, detector 30 detects the light emitted through the side of doped segment 20, i.e., detector 30 is placed adjacent to the cladding surrounding the core of the doped segment. Since the emission from doped segment 20 is omnidirectional, detector 30 should be positioned near enough to doped segment 20 to permit a wide capture angle. The side of doped segment 20 which is opposite detector 30 may be silvered or backed by a reflective surface 34 to redirect the emitted fluorescence towards detector 30. This will increase the fraction of fluorescent photons which are detected. If desired, a filter 36 can be used to select the wavelength(s) of interest for detection (those corresponding to the fluorescent signal) and reduce the detection of other wavelengths of light. If possible, the detector and fluorescent segment should be sealed within an opaque enclosure (not shown) to optically isolate them from ambient light.

Figure 3:
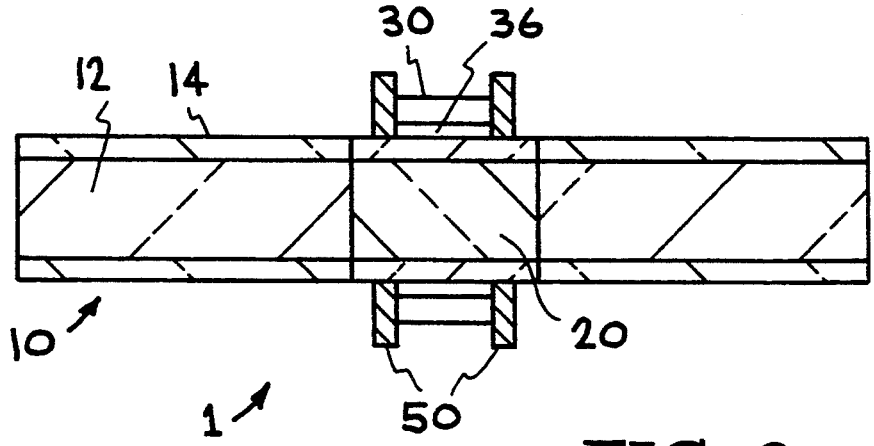
FIG. 3 shows another embodiment of the optical power measuring apparatus of the present invention, in which the detector used to detect the fluorescence emitted by the doped segment inserted into the optical fiber wraps around the segment.

FIG. 3 shows another embodiment of the optical power measuring apparatus 1 of the present invention, in which detector 30 and filter 36 are constructed so that they wrap around the circumference of doped segment 20. As before doped segment 20 is spliced into fiber 10, where fiber 10 has a core 12 and a cladding 14. Again a power indicator (not shown) is used to indicate the power contained in the signal propagating through fiber 10 based on the relationship between the intensity of the detected fluorescence emitted by doped segment 20 and the intensity of the signal.

One method of fabricating such a detector configuration would be to use a series of vacuum deposited layers which surround doped segment 20. Doped segment 20 would first have a dielectric passband filter 36 deposited as an annular layer. Next, a layer of an appropriate photoconductive material would be deposited over the filter layer. This layer of photoconductive material would serve as detector 30 and would detect the fluorescence emitted by doped segment 20. Conductive ring electrodes can be applied to the photoconductive layer to provide the bias and output connections. After doped segment 20 is spliced into fiber 10 an opaque ambient light blocking sleeve or metal collar (not shown) can be placed over the splice to provide additional optical isolation.

While the use of vacuum deposition techniques has been mentioned, it is understood that other methods such as painting, screening, or dip coating may be used to apply the filter and/or detector materials. Note that in the configuration of FIG. 3 there would be no need for reflective surface 34. Detector 30 could also be mounted in an integrating sphere or reflective tube surrounding doped segment 20.

Detector 30 should have a speed and sensitivity appropriate for the specific application. This means that the material from which it is fabricated should display sufficient sensitivity to the wavelength(s) of interest for detection, and insensitivity to others (which may be achieved by filtration or intrinsic spectral sensitivity). Photoelectric or photoconductive materials such as silicon, gallium arsenide, or cadmium sulfide are candidate materials from which to construct detector 30.

The apparatus and method of the present invention provide a non-intrusive means of determining the power carried by a signal propagating through an optical fiber. If the criteria mentioned for selecting the dopant material and dose are followed, the intensity of the induced fluorescence is proportional to the intensity of the signal, and this allows the power carried by the signal to be determined directly from measurements of the fluorescence. The present invention provides a simple and accurate means of determining the power carried by an optical fiber and is especially useful in situations in which it is not feasible or desirable to measure the power by placing a detector at the ends of the fiber.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. An apparatus for determining the power carried by an optical signal propagating through an optical fiber, the apparatus comprising:

a doped optical fiber segment formed in the optical fiber, the segment having a core doped with a dopant, the dopant being such that it emits a fluorescence when excited by the optical signal;

a detector for detecting the fluorescence emitted by the doped segment; and means responsive to the detector for determining the power of the optical signal based on the fluorescence detected by the detector.

2. The power determining apparatus of claim 1, wherein the dopant is a rare earth metal.

3. The power determining apparatus of claim 2, wherein the rare earth metal is erbium.

4. The power determining apparatus of claim 2, wherein the rare earth metal is neodymium.

5. The power determining apparatus of claim 1, wherein the dopant is an organic fluorescent dye.

6. The power measuring apparatus of claim 1, wherein the dopant is uniformly distributed across the cross sectional area of the doped segment.

7. The power determining apparatus of claim 1, wherein the intensity of the fluorescence emitted by the doped segment is proportional to the intensity of the propagating signal.

8. The power determining apparatus of claim 1, wherein the detector is disposed adjacent to and on one side of the doped segment.

9. The power determining apparatus of claim 8 further comprising:

a reflector disposed adjacent to the doped segment and opposite the side of the doped segment on which the detector is disposed for reflecting a portion of the emitted fluorescence back to the detector.

10. The power determining method of claim 1, wherein the detector wraps around the circumference of the doped segment.

11. The power determining apparatus of claim 1, wherein the doped segment is of sufficient length and dopant concentration to provide a detectable signal, but short enough to prevent the doped segment from serving as a gain medium.

12. A method for measuring the power carried by an optical signal propagating through an optical fiber, the method comprising:

adding a dopant to a segment of an optical fiber, the dopant emitting a fluorescence when excited by the optical signal;

detecting the fluorescence emitted by the doped segment; and determining the power carried by the optical signal based on the detected fluorescence.

13. The power measuring method of claim 12, wherein the dopant is a rare earth metal.

14. The power measuring method of claim 13, wherein the rare earth metal is erbium.

15. The power measuring method of claim 13, wherein the rare earth metal is neodymium.

16. The power measuring method of claim 12, wherein the dopant is an organic fluorescent dye.

17. The power measuring method of claim 12, wherein the dopant is uniformly distributed across the cross sectional area of the doped segment.

18. The power measuring method of claim 12, wherein the intensity of the fluorescence emitted by the doped segment is proportional to the intensity of the propagating signal.

19. The power measuring method of claim 12, wherein the fluorescence is detected by means of a detector disposed adjacent to and on one side of the doped segment.

20. The power measuring method of claim 19 further comprising:

disposing a reflector adjacent to the doped segment and opposite the side of the doped segment on which the detector is disposed for reflecting a portion of the emitted fluorescence back to the detector.

21. The power measuring method of claim 12, wherein the fluorescence is detected by a detector which wraps around the circumference of the doped segment.

22. The power measuring method of claim 12, wherein the doped segment is of sufficient length and dopant concentration to provide a detectable signal, but short enough to prevent the doped segment from serving as a gain medium.

* * * * *